Figure 1:
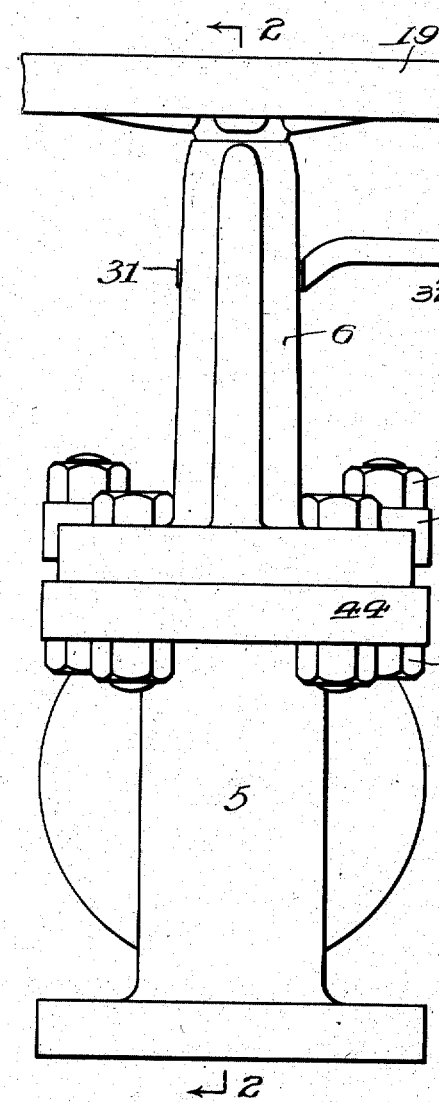

J. V. SCHMID & C. MASON.
VALVE.
APPLICATION FILED DEC. 23, 1909.

984,111.

Patented Feb. 14, 1911.

2 SHEETS—SHEET 1.

WITNESSES:
F. J. Hartman
Clifton C. Callowell

INVENTORS.
John V. Schmid
Carlisle Mason
BY
ATTORNEY.

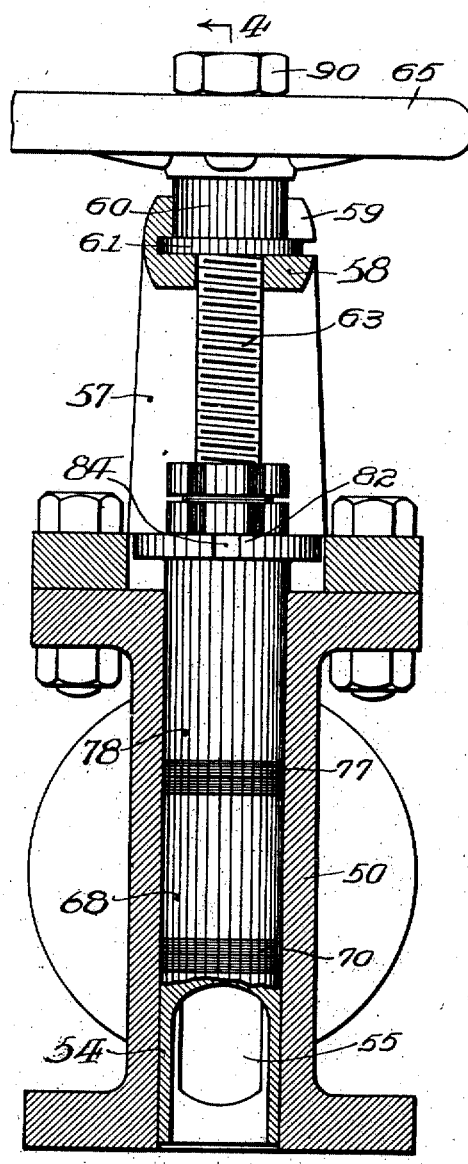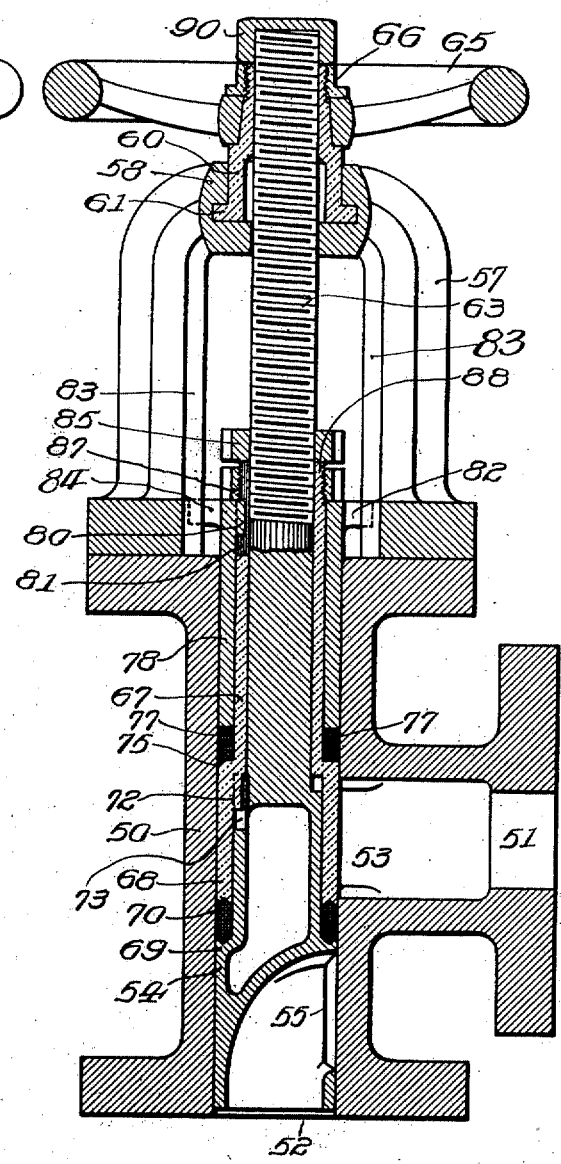

UNITED STATES PATENT OFFICE.

JOHN V. SCHMID, OF PHILADELPHIA, AND CARLISLE MASON, OF WYNDMOOR, PENNSYLVANIA, ASSIGNORS TO NELSON VALVE COMPANY, A CORPORATION OF PENNSYLVANIA.

VALVE.

984,111.

Specification of Letters Patent.   Patented Feb. 14, 1911.

Application filed December 23, 1909.   Serial No. 534,613.

*To all whom it may concern:*

Be it known that we, JOHN V. SCHMID, a citizen of the United States, and a resident of Philadelphia, county of Philadelphia, and State of Pennsylvania, and CARLISLE MASON, a citizen of the United States, and a resident of Wyndmoor, county of Montgomery, and State of Pennsylvania, have invented certain new and useful Improvements in Valves, of which the following is a specification, reference being had to the accompanying drawings.

This invention particularly relates to blow-off valves, and, as is well known, such valves are usually cut away and rendered useless by the grinding action of the passage of hard substances, such as scale which is contained in the sediment of a boiler, when said valves have the passageways extending therethrough in any way obstructed or tortuous.

The principal objects of this invention are to provide such a valve with an unobstructed passageway leading therethrough, whereby the sediment from a boiler may be directed through said valve without the usual grinding action of the hard particles carried thereby; to provide a reciprocatory piston having a port arranged to register with a port in the valve casing, and provided with packing rings spaced apart; to provide means whereby the respective packing rings may be adjusted or compressed independently; to provide convenient means to reciprocate said piston; and to provide means to limit the movement of said piston, and to visibly indicate the relative positions of the ports, within said valve.

The form of this invention hereinafter described provides a valve casing having a port, a reciprocatory piston having a port registerable with said casing port, means arranged to reciprocate said piston, and to determine the alternate positions of said piston, a packing ring surrounding said piston and carried thereby, and arranged to be disposed above the port in said casing when said piston is in open position, and below said port when said piston is in closed position; a sleeve surrounding said piston and forming a gland for said packing ring, and provided with means whereby it may be shifted relative to said piston to adjust said packing ring, a packing ring surrounding the said sleeve, and spaced from the packing ring surrounding said piston, a gland arranged to adjust the packing ring surrounding said sleeve, and separate means arranged to independently compress the respective packing rings; a frame carried by said casing, and including a bearing having means rotatably mounted therein, arranged to reciprocate said piston, and means carried by said piston arranged to prevent the relative rotation of said piston and the parts carried thereby, with respect to said casing.

This invention includes the various novel features of construction and arrangement hereinafter more definitely specified and claimed.

Figure 2:
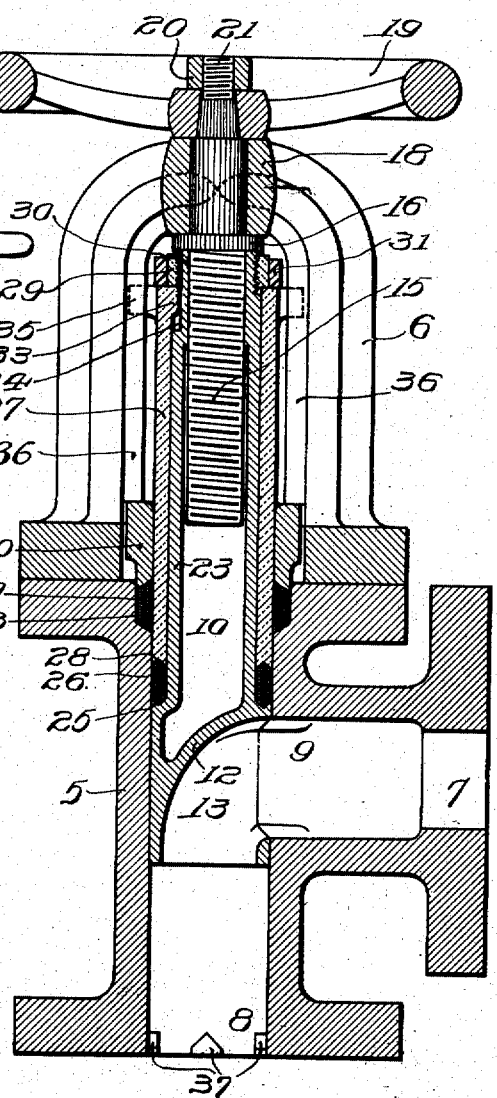

In the accompanying drawings, Figure 1 is a side elevation of a valve embodying a convenient form of this invention; Fig. 2 is a central vertical longitudinal sectional view of said valve taken on the line 2—2 in Fig. 1; Fig. 3 is a central transverse vertical sectional view of a valve conveniently embodying a modified form of this invention showing certain of the parts in elevation for convenience of illustration; and Fig. 4 is a central vertical longitudinal sectional view of the valve shown in Fig. 3, taken on the line 4—4 in said figure.

In the form of the invention shown in Figs. 1 and 2 in said drawings, the casing 5 is surmounted by the yoke frame 6, secured thereto, and is provided with the inlet and outlets 7 and 8 respectively, and the port 9. Said port 9 is arranged to be controlled by the reciprocatory piston 10, having the curved wall 12 arranged to direct fluid through the port 13, arranged to register with the port 9 in said casing. Said piston 10 is arranged to be reciprocated by its threaded engagement with the threaded spindle 15, having the collar 16, and mounted for rotation in the bearing 18 of the yoke frame 6. The spindle 15 is maintained in said bearing, and rotated therein by the hand wheel 19 which is secured thereto by the nut 20, in threaded engagement with the reduced end 21 of said spindle. Said piston 10 has the reduced region 23 intermediate of its length, which forms a shoulder 25 preferably having a V-shaped groove arranged to support the packing 26, which is arranged to be engaged by the sleeve 27 forming a gland surrounding said piston 10, and having an opposed V-shaped groove 28. The sleeve 27 is carried by the piston 10 and adjusted by the nut 29, which is in threaded engagement with the upper end 30 of said piston, and which is conveniently rotated by the spanner wrench 31, having the handle 32. Said wrench 31 surrounds the nut 29 and is thereby prevented from being detached from the valve; although as may be readily seen that when the piston 10 is lowered, said wrench may be uplifted above the nut 29, and relatively turned, and engaged therewith in different positions, its oscillatory movement being determined by the frame 6. The sleeve 27 is prevented from relative rotation with respect to the piston 10 by the lug 33 in unitary relation therewith, which forms a key extending into the slot or keyway 34 in said piston, as shown in Fig. 2, and said sleeve is also provided with the laterally extending lugs 35, arranged to engage the opposed ribs 36, on the frame 6, which form guides for said lugs 35 to prevent the rotation of said sleeve and piston with respect to the casing 5 when shifted by the rotary movement of the spindle 15, so that as may be readily seen, the port 13 is maintained in such alinement as to register with the port 9, when the piston 10, is shifted to the upper limit of its movement as shown in Fig. 2. The piston is arranged to be limited in its respectively upper and lower positions, by the collar 16 on the stem 15 engaging the nut 29, in its upper position, and by the lugs 37 in the bore of said casing 5, engaging the lower end of said piston when shifted downwardly. Said casing 5 provides an annular recess 38 at its upper end, arranged to receive the packing 39, which surrounds the sleeve 27 and is arranged to be compressed by the gland 40, having the laterally extending wings 41 arranged to be adjusted, to compress said packing, by the nuts 42, in threaded engagement with the bolts 43, extending through said wings, and the flange 44 of said casing. It may be here noted that the relative position of the lugs 35 with the ribs or guides 36, visibly indicates the relative positions of the ports 9 and 13. Furthermore, that by arrangement of the packing as above described, each of the packing rings 26 and 39 may be independently adjusted or compressed, so that when either of said packing rings tend to leak, it may be compressed by its respective gland, without disturbing the properly sealed packing ring.

In the form of our invention shown in Figs. 3 and 4 of the drawings, the casing 50 provides the inlet 51 and outlet 52, and has the port 53 controlled by the piston 54, having the port 55 arranged to register with said port 53 when said piston is shifted to its uppermost position. Said casing 50 is surmounted by the yoke frame 57, having the bearing 58, which is provided with the slot 59 whereby the hub 60, having the flange 61 in unitary relation therewith, may be laterally slipped into position, as best shown in Fig. 3. Said hub 60 is arranged to engage the threaded stem 63, formed in unitary relation with the piston 54, and said hub is conveniently rotated by the hand wheel 65 secured thereto by the nut 66, to reciprocate the piston 54 and thereby alternately open and close the port 53 in said casing. The piston 54 carries the sleeve 67, which forms a grooved gland 68 in opposition to the grooved shoulder 69, formed on said piston 54 for the packing 70. The sleeve 67 is provided with a lug 72, arranged to engage the recess 73 in said piston 54, to prevent their relative rotation, and said sleeve 67 provides a shoulder 75, arranged to carry the packing 77, conveniently compressed by the outer sleeve 78, surrounding the sleeve 67 and carried with said sleeve 67 and piston 54. The sleeve 78 has the lug 80 arranged to engage the slot 81 in the sleeve 67, and said sleeve 78 is also provided with the flanges 82 having recesses 84 in slidable engagement with the opposed ribs or guides 83 in the frame 57, and arranged to prevent relative rotation of the sleeves 67 and 78, and the piston 54 with respect to the casing 50. The sleeve 67 is conveniently adjusted to compress the packing 70, by the nut 85 in threaded engagement with the stem 63, and the sleeve 78 is adjustable relative to the sleeve 67, to compress the packing 77 by the nut 87, in threaded engagement with the upper end 88 of said sleeve 67. The piston 54 is limited in its downward movement by the nut 90, forming a cap for the end of the threaded stem 63, and arranged to engage the upper edge of the hub 60, and said piston is limited in its movement upward to register its port 55 with the port 53, by the bearing 58, which is arranged to be engaged by the nut 85, to register said ports. It may be noted that the bearing 58 being constructed as above described, affords a convenient means for assembling the parts, especially the hub 60, which has the flange 61 in unitary relation therewith. The slot 59 may be conveniently cut in said bearing by a milling cutter, and said hub slipped into said slot and engaged with the threaded stem 63 by rotation.

It is desired not to limit this invention to the precise details of construction and arrangement herein set forth, as it is obvious that various modifications may be made therein without departing from the essential features of the invention as defined in the appended claims.

Having thus described our invention, we claim:

1. A valve having a unitary casing provided with relatively fixed inlet and outlet ports and comprising a plurality of independently compressed packings relatively movable.

2. A valve comprising a piston having spaced packing rings, one being stationary and the other movable, arranged to be independently compressed.

3. A valve comprising a plurality of packing rings, and having means arranged to compress each of said packing rings independently, to bear upon different relatively movable cylindrical alined surfaces.

4. A valve comprising a unitary casing provided with an inlet and outlet in relatively fixed relation, and having a piston, packing rings surrounding said piston, and means arranged to independently compress said packing rings, by adjustment in the same direction.

5. A valve comprising a unitary casing provided with an inlet and outlet relatively fixed, and having a reciprocatory piston, spaced relatively movable packing rings surrounding said piston, and means arranged to independently compress said respective packing rings.

6. A valve comprising a unitary casing provided with an inlet and outlet in relatively fixed relation, and having a piston, spaced packing rings surrounding said piston, a sleeve forming a gland arranged to compress one of said packing rings, and a gland surrounding said sleeve arranged to compress the other of said packing rings independent of said sleeve.

7. A valve comprising a unitary casing provided with an inlet and an outlet relatively fixed, and a piston arranged to control the port leading to said outlet, spaced packing rings surrounding said piston and disposed between opposite sides of said port when closed, and upon the same side of said port when open, and means arranged to compress each of said packing rings separately.

8. In a valve, the combination with a casing having a port, a piston arranged to control said port, a packing ring surrounding said piston and carried thereby in such position as to be disposed above said port when open, and below said port when closed, means to compress said packing ring, a second packing ring spaced from the first packing ring and disposed above said port independent of the position of said piston, and means for independently compressing said second packing ring.

9. In a valve, the combination with a casing including a port, of a piston arranged to control said port, packing surrounding said piston, disposed above and below said port, in open and closed positions respectively, a sleeve forming a gland carried by said piston and arranged to compress said packing, packing surrounding said sleeve, and independent means arranged to compress the packing surrounding said sleeve.

10. In a valve, the combination with a casing having a port, of a reciprocatory piston arranged to control said port, packing carried by said piston, a sleeve forming a gland arranged to compress said packing, means in threaded engagement with said piston, arranged to shift said sleeve, packing surrounding said sleeve, and a gland independent of said sleeve arranged to compress the packing surrounding said sleeve.

11. In a valve, the combination with a casing including a port, of a reciprocatory piston arranged to control said port, a packing ring carried by said piston and arranged to be disposed above said port when open and below said port when closed, a sleeve forming a gland arranged to compress said packing, a packing ring surrounding said sleeve and disposed above said port, a gland arranged to compress the packing surrounding said sleeve, and independent means arranged to relatively shift said glands.

12. In a valve, the combination with a casing including a port, of a piston arranged to control said port, a packing ring carried by said piston in such relation thereto as to be disposed above and below said port in the respectively opened and closed positions of said piston, a sleeve forming a gland arranged to compress said packing ring and provided with means arranged to prevent rotation of said piston with respect to said casing, a packing ring surrounding said sleeve, a gland arranged to compress said packing ring, and independent means arranged to relatively shift said glands to separately compress said packing rings.

13. In a valve, the combination with a casing including a port, of a piston arranged to control said port, means arranged to shift said piston, packing surrounding said piston and carried thereby, a sleeve forming a gland arranged to compress said packing, means arranged to shift said sleeve with respect to said piston, a packing ring surrounding said sleeve, spaced from the packing surrounding said piston, a gland arranged to compress the packing surrounding said sleeve, and means arranged to shift said gland independent of said sleeve.

14. In a valve, the combination with a casing including a port, of a piston arranged to control said port, and having a port arranged to register with the port in said casing, means arranged to shift said piston, means arranged to limit the movement of said piston, a packing ring surrounding said piston and carried thereby, a sleeve forming a gland arranged to compress said packing and having means arranged to prevent the relative rotation of said piston with respect to said casing, a packing surrounding said sleeve, a gland arranged to compress said packing, and separate means arranged to shift said glands to independently compress the respective packing rings.

15. In a valve, the combination with a casing including a port, of a piston arranged to control said port, and provided with a port arranged to register therewith, means arranged to shift said piston, a stop arranged to limit the movement of said piston in closed position, separate packing rings surrounding said piston, and disposed above the port in said casing when open, and disposed upon opposite sides of said port when closed, and separate means arranged to compress said packing rings.

16. In a valve, the combination with a casing including a port, of a piston arranged to control said port, a packing ring carried by said piston, a sleeve carried by said piston forming a gland arranged to compress said packing, and provided with means arranged to prevent relative rotation of said piston, means in threaded engagement with said piston, arranged to relatively shift said sleeve to compress said packing ring, a wrench arranged to rotate said means to shift said sleeve, and means arranged to prevent the removal of said wrench from the valve.

17. In a valve, the combination with a casing including a port, of a piston arranged to control said port, a packing ring carried by said piston, a sleeve for said piston forming a gland for said packing, means in threaded engagement with said piston arranged to shift said sleeve to compress said packing, a packing ring surrounding said sleeve, a gland arranged to compress said packing, means to shift said gland independent of said sleeve, and means to prevent the rotation of said sleeve and said piston, with respect to said casing.

18. In a valve, the combination with a casing including a port, of a piston arranged to control said port, a frame carried by said casing and including a bearing, a threaded spindle rotatably mounted in said bearing in threaded engagement with said piston, means arranged to rotate said spindle to shift said piston, a packing ring carried by said piston, a sleeve forming a gland for said packing and arranged to be shifted with said piston, means arranged to shift said sleeve with respect to said piston to compress said packing, a packing ring surrounding said sleeve, a gland for said packing, and means arranged to shift said gland to compress said packing, independent of said sleeve.

19. In a valve, the combination with a casing including a port, of a piston arranged to control said port, a frame carried by said casing and including a bearing, a threaded spindle rotatably mounted in said bearing in threaded engagement with said piston, and having means to prevent axial movement of the spindle, a hand wheel arranged to rotate said spindle to shift said piston, a plurality of packing rings surrounding said piston, and means arranged to separately adjust said packing rings.

20. In a valve, the combination with a casing including a port, of a piston arranged to control said port, a frame provided with a guide and a bearing, means mounted in said bearing and connected to shift said piston, packing rings surrounding said piston, means operative to independently effect the adjustment of each of said packing rings, and means movable with said piston arranged to engage said guide to prevent rotation of said piston with respect to said casing.

21. In a valve, the combination with a casing including a port, of a piston arranged to control said port, a frame including a guide and a bearing exterior to said casing, a spindle in threaded engagement with said piston and provided with a collar arranged to prevent its axial movement in said bearing and to limit the movement of said piston in one direction, means arranged to rotate said spindle to shift said piston, lugs in said casing arranged to limit the movement of said piston in the other direction, means carried by said piston arranged to engage said guide to prevent relative rotation of said piston and casing.

22. In a valve, the combination with a casing having relatively fixed inlet and outlet ports, of a piston arranged to control the inlet port and having a port arranged to register therewith, a plurality of packing rings embracing said piston, means arranged to independently compress the respective packing rings, and means carried by said piston arranged to visibly indicate the relative positions of said ports.

23. A valve having a piston, packing rings surrounding said piston, and means above the valve casing to independently adjust said packing rings.

24. A valve having a piston, packing rings surrounding said piston, independent means operative to separately effect the adjustment of said packing rings, and means located between said adjusting means to prevent said piston from rotating.

25. A valve comprising a piston, packing rings carried on and around said piston respectively, and independent means exterior to the valve casing arranged to adjust said packing rings.

26. A valve comprising a plurality of independently compressed packings which are relatively movable.

27. A valve comprising a stationary packing ring and a movable packing ring, each being independently compressed.

In witness whereof we have hereunto set our hands this 21st day of December, 1909.

JOHN V. SCHMID.
CARLISLE MASON.

Witnesses:
ALEXANDER PARK,
ROBERT H. CRAWFORD.